United States Patent [19]

Satzler

[11] Patent Number: 5,127,714
[45] Date of Patent: Jul. 7, 1992

[54] BELT ALIGNMENT MECHANISM FOR A BELT DRIVEN VEHICLE

[75] Inventor: Ronald L. Satzler, Princeville, Ill.

[73] Assignee: Caterpillar Inc., Peoria, Ill.

[21] Appl. No.: 656,906

[22] Filed: Feb. 4, 1991

[51] Int. Cl.⁵ .............................................. B62D 55/15
[52] U.S. Cl. ........................................ 305/60; 305/21; 198/806; 180/9.38; 180/9.46
[58] Field of Search ....................... 305/16, 21, 24, 39, 305/47, 60, 23, 27, 28; 198/806, 807, 840; 180/6.7, 9.1, 9.52, 9.62, 9.64, 9.38, 9.46; 474/102

[56] References Cited

U.S. PATENT DOCUMENTS

| 2,304,843 | 12/1942 | Nordquist | 198/807 |
| 3,170,531 | 2/1965 | Katzenberger | 180/9.1 |
| 3,313,368 | 4/1967 | Carter et al. | 180/9.1 |
| 3,687,273 | 8/1972 | Macone et al. | 198/806 |
| 4,693,363 | 9/1987 | Kuehnert | 198/807 |

FOREIGN PATENT DOCUMENTS

| 323325 | 8/1919 | Fed. Rep. of Germany | 474/102 |
| 619549 | 9/1935 | Fed. Rep. of Germany | 180/9.1 |

*Primary Examiner*—Russell D. Stormer
*Attorney, Agent, or Firm*—J. Wesley Blumenshine

[57] ABSTRACT

The invention described herein is a belt alignment mechanism for causing the belt of a belt driven vehicle to run true. In such vehicles, the belt runs around wheels and often such belts have a tendency to run to one side of the wheels or in other words not run true. By angling one of the wheels in a direction opposite to the direction the belt runs untrue, the belt can be made to run true. The belt alignment mechanism described herein has a member for angling one of the wheels and a jack for fixing the wheel in the angled position so the belt runs true.

9 Claims, 3 Drawing Sheets

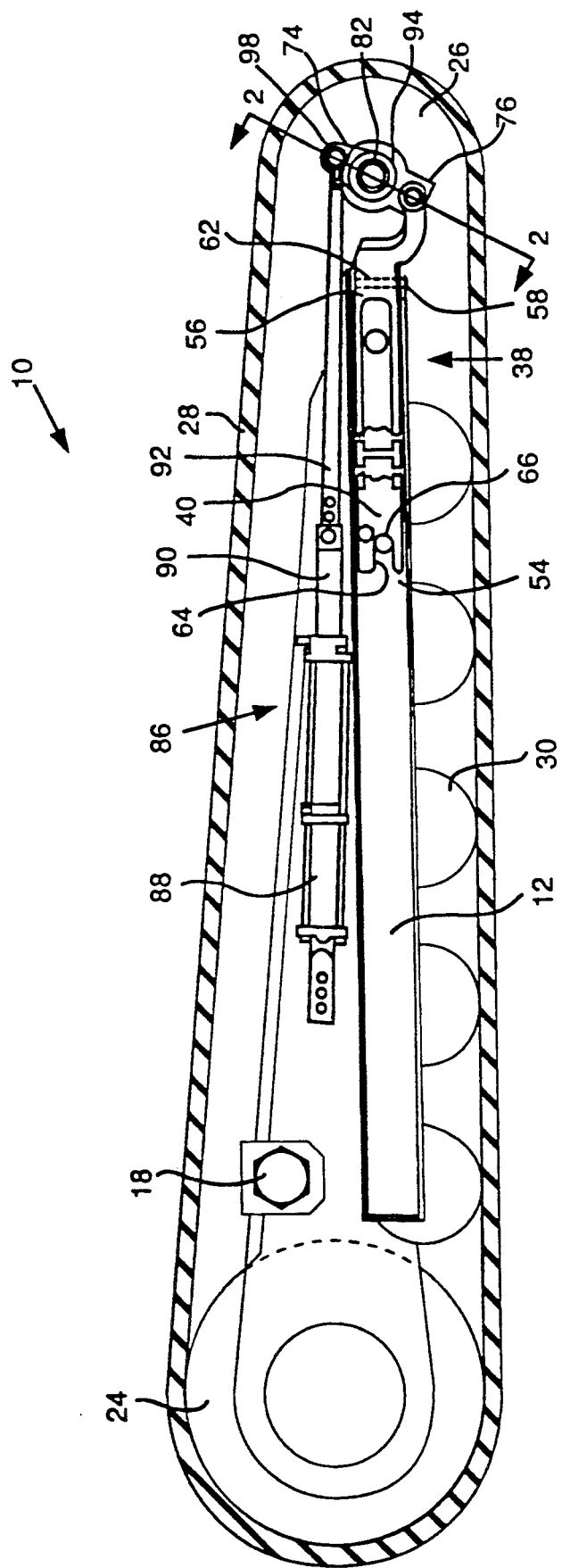

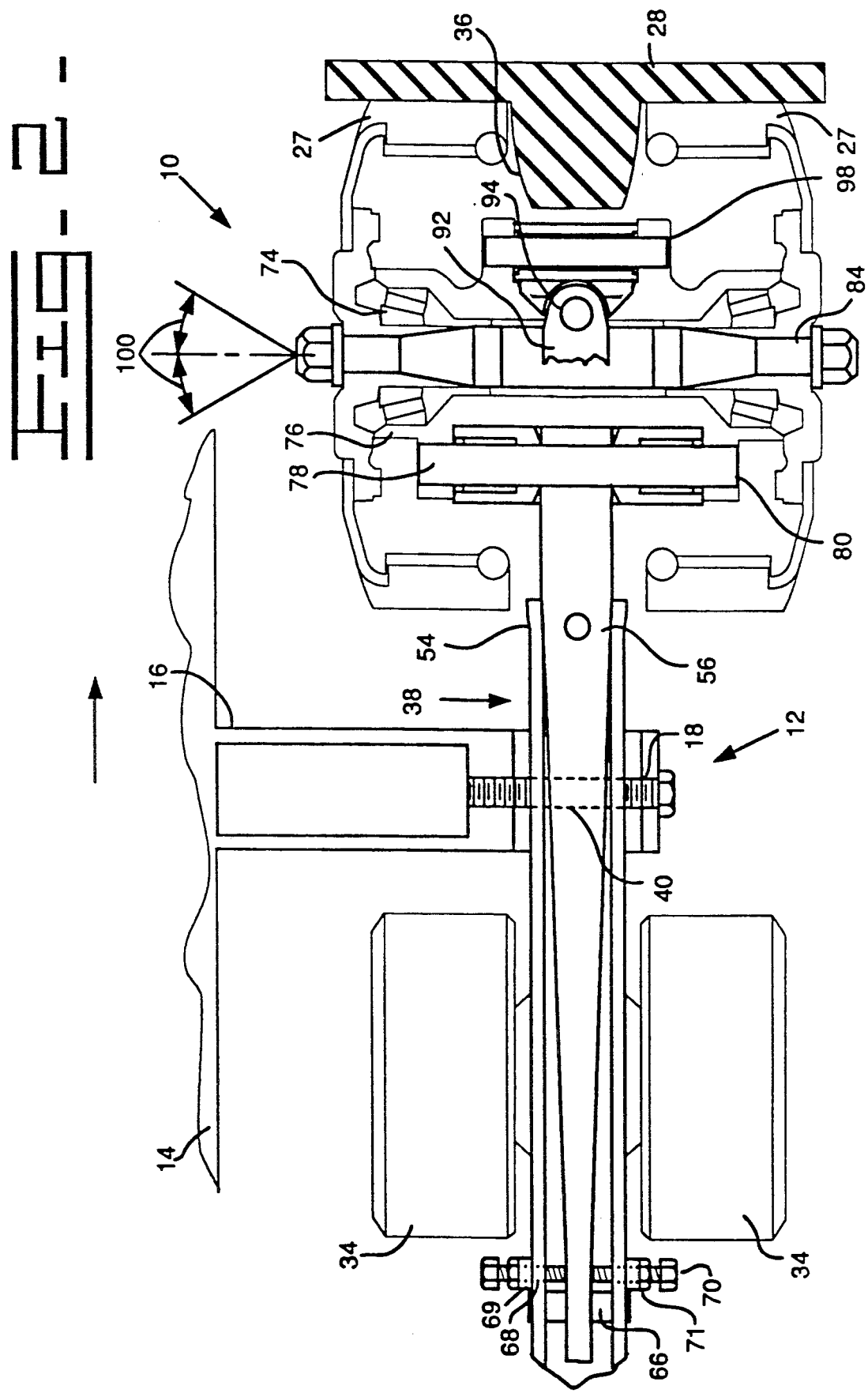

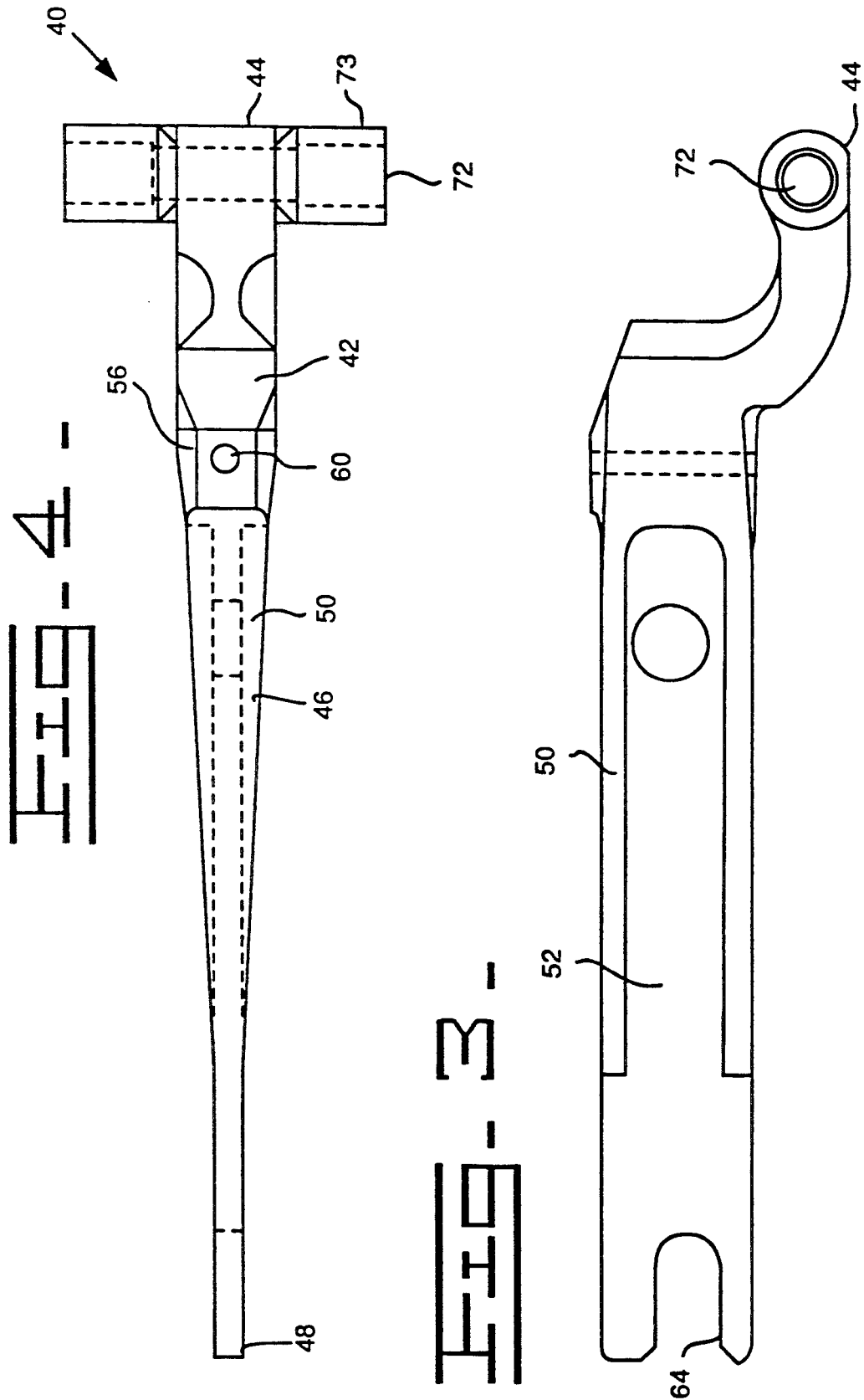

1

BELT ALIGNMENT MECHANISM FOR A BELT DRIVEN VEHICLE

TECHNICAL FIELD

This invention relates to crawler-type vehicles such as asphalt pavers and tractors having continuous belts over wheels for providing both ground support and tractive effort, and more particularly, to an alignment mechanism for angling one of the wheels on which the belt runs so as to cause a belt which has a tendency to run or slide to one side of the wheels to stay centered on the wheels and run "true".

BACKGROUND ART

Belt driven vehicles are well known. The belt drive system of such vehicles is usually comprised of a continuous belt which runs over wheels, at least one of which is a drive wheel, the others possibly being idlers or mid-rollers. A vital concern in such drive systems is that the belt stays centered on the wheels, as opposed to moving or sliding to one side (laterally) so as to provide optimum ground support and tractive effort, to prolong belt and wheel life, and to eliminate vehicle down time if the belt were to come completely off the wheels.

Whether the belt is made of metallic links which interact with teeth on the wheels, much like a sprocket and chain on a bicycle; or the belt is made of rubber and has a rib which rides in a groove on the wheels or between a pair of spaced wheels; or the belt and wheels are smooth; if the belt does not stay properly positioned on the wheels and run true there may be excessive and premature wear to the belt and wheels due to unintended rubbing, undesirable heating of components, and inefficiencies in operation.

One way to cause the belt to run true is to angle the wheel(s) in the direction opposite to the direction in which the belt is running untrue. One known way for angling the wheel(s) is by putting tapered shims on the axle between the wheel and the hub. These shims have a hole therein the size of the axle and they are slid onto the axle between the wheel and the hub. A major drawback to the shims is that the belt and wheels and other parts must be removed to install them and then reassembled in order to test whether enough, too much or too little shim was installed, and then possibly the process repeated.

No matter what means is used for angling the wheel(s), the wheel must stay in its angled position when exposed to the extreme pressures and concussions that vehicles, and especially work vehicles, are exposed to.

The invention described herein overcomes the problems previously described by providing a durable, reliable, field adjustable, easily readjustable belt alignment mechanism.

DISCLOSURE OF THE INVENTION

In a belt driven vehicle having a belt drive system in which a belt runs over wheels and in which the belt has a tendency to not run true, a belt alignment mechanism for causing the belt to run true is disclosed. By angling one or both of the front or rear wheels in a direction opposite to the direction in which the belt runs untrue, the belt will run true.

In one aspect of the invention, a means for angling one of the wheels to an angled position and a means for fixing the wheel at the angled position is disclosed. A preferred means for angling one of the wheels is an elongate member having a first end able to move laterally and connected to the axle of the wheel, a second end able to move laterally, and a mid-portion fixed against lateral movement. By moving the second end of the elongate member laterally in one direction the elongate member will pivot about the fixed mid-portion thus laterally moving the first end in the other direction thereby angling the wheel. A preferred means for fixing the wheel at the angled position is by fixing a jack member against each side of the elongate member near its second end to prevent lateral movement.

In another aspect of the present invention, a method is disclosed for causing the belt to run true comprising the steps of angling one of the wheels in the direction opposite to the direction the belt has a tendency to run to an angled position and then fixing the wheel at the angled position.

BRIEF DESCRIPTION OF THE DRAWINGS

FIG. 1 is a diagrammatical side view of a belt drive system and belt alignment mechanism of the present invention;

FIG. 2 is a diagrammatical partial top view of the belt drive system and belt alignment mechanism of FIG. 1;

FIG. 3 is a diagrammatical side view of an angling means of the belt alignment mechanism; and FIG. 4 is a diagrammatical top view of the angling means of FIG. 3.

BEST MODE FOR CARRYING OUT THE INVENTION

Referring now to the drawings, a preferred belt drive system 10 is shown. The system shown is a right side system. An identical system would be provided on the left side of the vehicle. The belt drive system 10 is supported by a roller frame 12 which is connected to the vehicle frame 14 by two supports 16 (only one fully shown). The two supports 16 are welded to the vehicle frame 14 and bolted 18 to the roller frame 12.

The belt drive system 10 includes a rear wheel 24 consisting of a pair of spaced wheels (not shown), which is hydraulically driven, a front wheel 26 consisting of a pair of spaced wheels 27, which is not driven but instead idles, meaning the wheel 26 turns with the belt 28 due to the frictional forces between the belt 28 and wheel 26, and a number of free-turning mid-rollers 30 consisting of pairs of spaced wheels 34.

The belt 28 is mounted around the front and rear wheels 26, 24 and across the mid-rollers 30. The belt 28 is made of rubber. The belt 28 has a center rib 36 which runs between the spaced wheels of the front wheel 26, the rear wheel 24, and the mid-rollers 30.

Forming part of the roller frame 12 is the belt alignment mechanism 38. The belt alignment mechanism 38 includes the member 40. The member 40 is elongate and, while being only a single member, includes two distinct portions, a first solid, rectangular portion 42 extending from the first end 44 and a second I-beam portion 46 extending from the second end 48. The member 40 is made of cast steel and is about 0.97 meters long and about 12.1 centimeters high at the second portion 46. The flanges 50 of the second portion 46 of the member 40 taper 3 degrees from 7.6 centimeters where the flanges 50 meet the first portion 42 to 2.5 centimeters which is the width of the web 52.

The member 40 is press fitted into a hollow frame portion 54 of the roller frame 12. The hollow frame 54 has a rectangular shape having internal dimensions of about 12.7 centimeters high and about 7.6 centimeters wide. The press fit of the member 40 into the hollow frame 54 supports the member 40 and fixes the mid-portion 56 of the member 40 from lateral movement. The hollow frame 54 and the first portion 42 of the member 40 have holes 58, 60 therein which align when the member 40 has been press fitted to its proper position and through which a first pin 62 is inserted and welded to the hollow frame 54. The hole 60 is slightly larger than the first pin 62 so that the first pin 62 is loosely fit in the hole 60. The first pin 62 keeps the member 40 from working longitudinally loose from the hollow frame 54. The second end 48 of the member 40 is slotted 64. A support tube 66 extends laterally through and is welded to the hollow frame 54. The slot 64 at the second end 48 of the member 40 slides over the support tube 66 as the member 40 is pressed fitted into the hollow frame 54. The support tube 66 supports the second end 48 of the member 40 and relieves vertical stresses on the hollow frame 54 at the press fit, which would otherwise be created by the weight of the second portion 46 of the member 40.

Near to the support tube 66, each side of the hollow frame 54 has a hole 68 covered by a boss 69 for receiving a jack member 70. In this case, the holes 68 and bosses 69 are threaded and the jack members 70 are large steel screws having lock nuts 71. After the member 40 is press fitted into position, the jack screws 70 are threaded into the threaded holes 68 from the outside of the hollow frame 54 until they make contact with and fix the lateral position of the second end 48 of the member 40, at which time the lock nuts 71 are tightened.

The first end 44 of the member 40 is widened by a pair of spacers 73 that are welded to the member 40. The first end of the member 40 has a laterally extending hole 72 therethrough. A swivel link 74 having two spaced apart arms 76 is connected to the member 40 by a pivot pin 78 inserted through the holes 80 in the arms 76 of the swivel link 74 and the hole 72 in the first end 44 of the member 40. Also connected to the swivel link 74 through another set of holes 82 in the swivel link 74 is the axle 84 of the front wheel 26. The member 40 supports the axle 84 through the swivel link 74, and the axle 84 in turn supports the wheel 26, thus the member 40 supports the wheel 26. Because the member 40 is connected directly to the swivel link 74 and connected indirectly to the axle 84, as opposed to being connected directly to the axle 84, the axle 84 is able to float between a range of positions even though the member 40 is fixed. As used herein, the word "connected" is intended to include direct connections between two members without any other members interposed therebetween and indirect connections between members in which one or more other members may be interposed therebetween. Thus, for example, it is to be understood that the member 40 is connected to the wheel 26 even though the member 40 is directly connected to the axle 84 of the wheel 26 which is directly connected to the wheel 26.

The belt drive system 10 also includes a recoil system 86 for absorbing shocks to the front wheel 26 when the front wheel 26 encounters an obstruction. As soon as the obstruction is removed or traversed, the recoil system 86 returns the front wheel 26 to the forward position.

The recoil system 86 includes a hydraulic cylinder 88 having a piston 90 mounted therein and extending therefrom. The piston 90 is connected to a linkage 92 which in turn is connected by a pivot pin 94 to a link 96 which in turn is connected by another pivot pin 98 to the swivel link 74. The recoil system's 86 neutral position is designed to keep the front wheel 26 and the swivel link 74 in the forward position shown in FIG. 1. However, because the front wheel 26 is connected to the member 40 by the swivel link 74, rather than the axle 84, the axle 84 and wheel 26 are able to floatbackwards. The front portion of the member 40 is curved downwards to avoid obstructing the recoil of the front axle 84.

It should be understood that the belt alignment mechanism 38 described herein is equally applicable without a recoil system 86 or if the member 40 is connected directly to the front axle 84, or with only the rear wheel 24 or with both the front and rear wheels 26, 24 of the belt drive system 10.

INDUSTRIAL APPLICABILITY

Initially, the belt drive system 10 should be installed on the vehicle in its designed configuration. Probably, this is a configuration in which the front wheel 26 is not angled, and the member 40 is centered in the hollow frame 54, which can be determined by whether the jack members 70 are inserted an equal distance. Now, assuming that at some time the belt 28 does not run true but instead has a tendency to run to one side, the belt drive system 10 may be adjusted by the belt alignment mechanism 38 so that the belt 28 will run true. Attention is directed to FIG. 2. First, the jack screw 70 on the side of the hollow frame 54 corresponding to the direction in which the belt 28 runs untrue is loosened. Next, the opposing jack screw 70 is tightened, thus slightly pivoting the member 40 about the mid-portion 56 which in turn slightly angles the first end 44 of the member 40, and in turn the axle 84 of the wheel 26, and in turn the wheel 26, in the direction opposite to the direction the belt 28 has a tendency to run to an angled position 100 (shown in FIG. 2 at zero degrees). Angling the front wheel 26 one-half to one and one-half degrees should be about all that is needed to make the belt 28 run true. Next, the loosened jack screw 70 is retightened against the member 40. Lastly, the belt drive system 10 is tested to see if the belt 28 runs true or if the system 10 needs further adjustment refinements.

Other aspects, objects, and advantages of this invention can be obtained from a study of the drawings, the disclosure, and the appended claims.

I claim:

1. For a belt driven vehicle having a belt drive system having a front wheel and a rear wheel around which a belt runs, a belt alignment mechanism the function of which is independent of the steering of said vehicle, comprising:

a member having a first end connected to one of said wheels;

a means for angling said first end of said member thus angling said one of said wheels to an angled position; and a means for fixing said first end of said member and said wheel at said angled position.

2. The belt alignment mechanism of claim 1, said member providing support to said wheel.

3. The belt alignment mechanism of claims 1 or 2, said member being elongate and further comprising a second end and a mid-portion which is fixed from lateral movement and about which the first and second ends of said member are pivotal in opposite lateral directions.

4. The belt alignment mechanism of claims 1 or 2, said angled position fixing means being a pair of opposing jack members each of which contacts opposing sides of said member.

5. For a belt driven vehicle having a belt drive system mounted on a roller frame, said belt drive system having a front wheel and a rear wheel around which a belt runs, a belt alignment mechanism the function of which is independent of the steering of said vehicle, comprising:
- a member connected to said roller frame having a first end connected to one of said wheels, a second end and a mid-portion; and
- said mid-portion of said member being fixed from lateral movement.

6. The belt alignment mechanism of claim 5, a part of said roller frame being a hollow frame, said member being at least partially housed within said hollow frame such that said second end of said member is within said hollow frame and said first end of said member is outside said hollow frame.

7. In a belt driven vehicle having a belt drive system, said belt drive system having a front wheel and a rear wheel around which a belt runs, a belt alignment mechanism comprising a member having a first end connected to one of said wheels, a second end and a mid-portion fixed from lateral movement, a method for causing said belt to run true, comprising the steps of:
- laterally moving said second end of said member in the direction which the belt runs untrue causing said member to pivot about said mid-portion thus causing said first end of said member and the wheel to which said first end is connected to be angled in the direction opposite to which said belt runs untrue to an angled position; and
- fixing said member from lateral movement thus fixing said wheel at said angled position.

8. For a belt driven vehicle having a belt drive system having a front wheel and a rear wheel around which a belt runs, a belt alignment mechanism, comprising:
- an elongate member having a first end connected to one of said wheels, a second end and a mid-portion which is fixed from lateral movement and about which said first and said second ends of said member are pivotal in opposite lateral directions;
- a means for angling said first end of said member thus angling said one of said wheels to an angled position; and
- a means for fixing said first end of said member and said wheel at said angled position.

9. For a belt driven vehicle having a belt drive system having a front wheel and a rear wheel around which a belt runs, a belt alignment mechanism, comprising:
- a member having a first end connected to one of said wheels;
- a means for angling said first end of said member thus angling said one of said wheels to an angled position; and
- a pair of opposing jack members each of which contacts opposing sides of said member for fixing said first end of said member and said wheel at said angled position.

* * * * *